US010186137B2

(12) United States Patent
Zokaei et al.

(10) Patent No.: US 10,186,137 B2
(45) Date of Patent: Jan. 22, 2019

(54) SYSTEM, METHODS AND APPARATUS FOR A LEAK DETECTOR AND MONITOR

(71) Applicant: Vidtek Associates NV, Inc., Sparks, NV (US)

(72) Inventors: Reza Zokaei, Sparks, NV (US); Mohammad Jalilian, Sparks, NV (US)

(73) Assignee: VIDTEK ASSOCIATES INC., Santa Clara, CA (US)

( * ) Notice: Subject to any disclaimer, the term of this patent is extended or adjusted under 35 U.S.C. 154(b) by 0 days.

(21) Appl. No.: 15/170,854

(22) Filed: Jun. 1, 2016

(65) Prior Publication Data

US 2016/0351040 A1 Dec. 1, 2016

Related U.S. Application Data

(60) Provisional application No. 62/169,170, filed on Jun. 1, 2015.

(51) Int. Cl.
*G08B 17/10* (2006.01)
*G08B 21/20* (2006.01)
(Continued)

(52) U.S. Cl.
CPC ............ *G08B 21/20* (2013.01); *H04W 4/006* (2013.01); *H04W 4/12* (2013.01); *H04W 4/38* (2018.02); *H04W 84/12* (2013.01)

(58) Field of Classification Search
CPC .................................................... G08B 21/18
(Continued)

(56) References Cited

U.S. PATENT DOCUMENTS

2001/0054965 A1* 12/2001 Blum ..................... G08B 21/20
340/605
2006/0007008 A1* 1/2006 Kates .................... G01M 3/002
340/605
(Continued)

*Primary Examiner* — Thomas S McCormack
(74) *Attorney, Agent, or Firm* — Palo Alto Legal Group P.C.; Omair M. Farooqui; Aziz M. Ahsan

(57) ABSTRACT

Aspects of the present invention include a leak detector and monitor comprising: at least one leak sensor adapted to detect a leak of a substance; at least one microcontroller adapted to receive a signal from the leak sensor; and at least one wireless communication module adapted to receive the signal from the microcontroller, whereby the wireless communication module transmits an electronic message to at least one user, whereby the user wirelessly communicates his instructions to the microcontroller to exercise control over at least one electrical valve by transmitting at least one electrical signal to the electrical valve. Aspects of the present invention include a leak detector and monitor comprising: at least one leak sensor adapted to detect a leak of a substance; at least one microcontroller adapted to receive a signal from the leak sensor; and at least one wireless communication module adapted to receive the signal from the microcontroller, whereby the wireless communication module transmits an electronic message to an Internet cloud based server and the Internet cloud based server transmits the electronic message to a user's device, whereby the user wirelessly communicates his instructions to the Internet cloud based server and the Internet cloud based server transmits the user's instructions to the microcontroller to exercise control over at least one electrical valve by transmitting at least one electrical signal to the electrical valve. Aspects of the present invention include a method of remotely exercising control over an electrical valve comprising the steps of: positioning a leak detector in a location to amenable to detecting leaks; receiving a notification of a leak; and communicating (Continued)

instructions to exercise control over an electrical valve, whereby causing the electrical valve to be shut off.

20 Claims, 7 Drawing Sheets

(51) Int. Cl.
    *H04W 4/38*     (2018.01)
    *H04W 4/00*     (2018.01)
    *H04W 4/12*     (2009.01)
    *H04W 84/12*    (2009.01)

(58) Field of Classification Search
    USPC .................................................. 340/604, 605
    See application file for complete search history.

(56) References Cited

U.S. PATENT DOCUMENTS

| | | | | |
|---|---|---|---|---|
| 2010/0302047 | A1* | 12/2010 | Wood | G01M 3/16 |
| | | | | 340/605 |
| 2012/0144898 | A1* | 6/2012 | Brasel | B67D 1/12 |
| | | | | 73/40.5 R |
| 2013/0049968 | A1* | 2/2013 | Fleury, Jr. | G01M 3/00 |
| | | | | 340/605 |
| 2013/0080081 | A1* | 3/2013 | Dugger | G01F 1/667 |
| | | | | 702/48 |
| 2013/0255798 | A1* | 10/2013 | McAward | E03B 7/071 |
| | | | | 137/455 |
| 2016/0177546 | A1* | 6/2016 | Cregg | H04L 12/6418 |
| | | | | 700/282 |

* cited by examiner

SYSTEM, METHODS AND APPARATUS FOR A LEAK DETECTOR AND MONITOR

CROSS-REFERENCE TO RELATED APPLICATIONS

The instant patent application claims priority to and the benefit of pending U.S. Provisional Patent Application Ser. No. 62/169,170, filed on Jun. 1, 2015, titled "SYSTEM METHODS AND APPARATUS FOR A LEAK DETECTOR AND MONITOR," the entire disclosure of which provisional application is incorporated herein by reference.

FIELD OF THE INVENTION

Aspects of the present invention relate generally to a system, methods, and apparatus for a leak detector and monitor. Aspects of the present invention may be implemented with leak detectors for any type of solid, liquid, or gas. Aspects of the present invention may be implemented with any type of sensory detector such as, for example, a temperature, CO, or CO2 detector. Aspects of the present invention relate to a system, methods, and apparatus for a Wi-Fi leak detector and monitor. More specifically, aspects of the present invention relate to a system, methods, and apparatus for a Wi-Fi leak detector, monitor and valve controller. Aspects of the present invention include the ability to communicate via voice message, text message, email and other wireless communication methods to the property owner, manager, resident, person responsible for a dwelling, call center or other designated contacts in the event of a leak.

BACKGROUND OF THE INVENTION

If you are a property owner, manager, resident, or person responsible for a dwelling, there is always a chance of a leak in your dwelling, facility or equipment while you are away for a period of time, such as, for example while you are away at work or on vacation or otherwise absent from the property. As a further example, there is a chance of a leak in a multiple level dwelling without the resident aware of the leak, for example, in the basement of a building. However, if there was a way to monitor dwellings, other buildings and equipment for operating or environmental failure so that reparative action can be taken in a timely manner, costly and time consuming damages could be prevented. Accordingly, there is an urgent need for a system, method and apparatus for a leak detector and monitor.

PURPOSES AND SUMMARY OF THE INVENTION

Aspects of the present invention include a leak detector and monitor comprising: at least one leak sensor adapted to detect a leak of a substance; at least one microcontroller adapted to receive a signal from the leak sensor; and at least one wireless communication module adapted to receive the signal from the microcontroller, whereby the wireless communication module transmits an electronic message to at least one user, whereby the user wirelessly communicates his instructions to the microcontroller to exercise control over at least one electrical valve by transmitting at least one electrical signal to the electrical valve.

Aspects of the present invention include leak detector and monitor comprising: at least one leak sensor adapted to detect a leak of a substance; at least one microcontroller adapted to receive a signal from the leak sensor; and at least one wireless communication module adapted to receive the signal from the microcontroller, whereby the wireless communication module transmits an electronic message to an Internet cloud based server and the Internet cloud based server transmits the electronic message to a user's device, whereby the user wirelessly communicates his instructions to the Internet cloud based server and the Internet cloud based server transmits the user's instructions to the microcontroller to exercise control over at least one electrical valve by transmitting at least one electrical signal to the electrical valve.

Aspects of the present invention include a method of remotely exercising control over an electrical valve comprising the steps of: positioning a leak detector in a location to amenable to detecting leaks; receiving a notification of a leak; and communicating instructions to exercise control over an electrical valve, whereby causing the electrical valve to be shut off.

BRIEF DESCRIPTION OF THE DRAWINGS

Although the scope of the present invention is much broader than any particular embodiment, a detailed description of the preferred embodiment follows together with drawings. These drawings are for illustration purposes only and are not drawn to scale. Like numbers represent like features and components in the drawings. The invention may best be understood by reference to the ensuing detailed description in conjunction with the accompanying drawings.

DETAILED DESCRIPTION

Figure 1A:
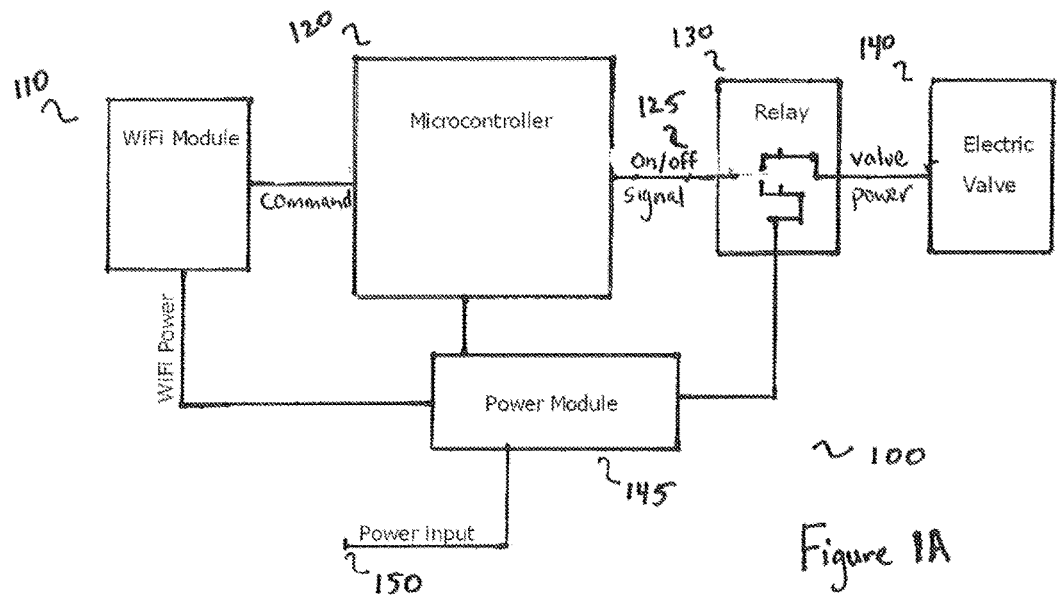
FIG. 1A is an exemplary block diagram of an exemplary embodiment of the present invention.

At the outset, and as previously stated, it is understood that aspects of the present invention may be implemented with leak detectors for any type of liquid, gas, or solid. For example, aspects of the present invention may be used with carbon monoxide detectors, carbon dioxide detectors, temperature detectors, smoke detectors, etc. Aspects of the present invention may be used in any environment, and any location, indoors and/or outdoors.

In one exemplary embodiment, a leak detector and monitor assists property owners, such as, for example, residential, industrial, governmental, military, restaurant, hospital, medical, and any commercial building, to remotely monitor leak problems, such as, for example, water leaks so that corrective action can be taken to minimize damage to property. In one exemplary embodiment, the malfunctioning water pipe or appliance could be manually shut off after a notification is sent to the user. In another embodiment, the source to the malfunctioning water pipe or the malfunctioning appliance itself can be shut off remotely. In another embodiment, a request for an inspection can be initiated wirelessly as well.

In one exemplary embodiment, a leak detector and monitor is comprised of one or more components. In one exemplary embodiment, a leak detector and alert monitor includes a sensing unit or sensing device (used herein interchangeably). In one exemplary embodiment, a leak detector and alert monitor includes a notification protocol. In one exemplary embodiment, a leak detector and alert monitor includes an action device.

In one exemplary embodiment, the sensing unit includes a leak sensor. The leak sensor may be any type of sensor, such as, for example, a sensor that detects liquid leaks, gas leaks, or solid leaks. In one exemplary embodiment, the leak sensor is a water leak sensor. In one exemplary embodiment the leak sensor is a CO leak sensor.

In one exemplary embodiment, the sensing unit includes a microcontroller. In one exemplary embodiment, the microcontroller is a computer on a single integrated circuit containing a processor core, memory, and programmable input/output peripherals. Program memory in the form of Ferroelectric RAM, NOR flash or OTP ROM is also often included on chip, as well as a typically small amount of RAM. In one exemplary embodiment, the microcontroller is designed for embedded applications. In one exemplary embodiment, the microcontroller is used to automatically control various devices, products and processes. In one exemplary embodiment, mixed signal microcontrollers integrate analog components needed to control non-digital electronic systems, such as, for example, a valve. In one exemplary embodiment, the microcontroller contains at least one general purpose input/output pin (GPIO). GPIO pins are software configurable to either an input or an output state. When GPIO pins are configured to an input state, they are often used to read sensors or external signals. Configured to the output state, GPIO pins can drive external devices such as LEDs, valves, etc. Many embedded systems need to read sensors that produce analog signals. This is the purpose of the analog-to-digital converter (ADC). Since processors are built to interpret and process digital data, i.e. 1s and 0s, they are not able to do anything with the analog signals that may be sent to them by a device. The ADC is used to convert the incoming data into a form that the processor can recognize. A less common feature on some microcontrollers is a digital-to-analog converter (DAC) that allows the processor to output analog signals or voltage levels. In addition to the converters, many embedded microprocessors include a variety of timers as well. One of the most common types of timers is the Programmable Interval Timer (PIT). A PIT may either count down from some value to zero, or up to the capacity of the count register, overflowing to zero. Once it reaches zero, it sends an interrupt to the processor indicating that it has finished counting. This is useful for devices such as thermostats, which periodically test the temperature around them to see if they need to turn the air conditioner on, the heater on, etc.

In one exemplary embodiment, once the water leak sensor detects water, by way of, for example, an alert signal, a microcontroller will cause the notification protocol to notify the home owner or representative, such as, for example a call center, or a property manager, or a family friend or neighbor, to be notified immediately and a record of that event will be logged. In one exemplary embodiment, the notification protocol may also initiate other exemplary methods to communicate the detection of the water, such as, for example, sending an alert email, sending a text message, calling a property manager, friend or neighbor, and/or sending a notification to the owner's smart phone, or tablet. In one exemplary embodiment, the notification protocol causes a flashing light or some other visual notification at the unit to alert the property occupant. In one exemplary embodiment, the notification protocol may cause a sound notification at the unit, such as a large or blaring alarm to alert the responsible parties. In one exemplary embodiment, the notification protocol communicates to the responsible party by way of an email, text message, phone message, or other electronic form of communicated message, with the property manager, friend or neighbor, and/or property owner, or person residing at the dwelling, such as, for example an occupant. In one exemplary embodiment, the notification protocol notifies someone who is remote at the time of the leak.

In one exemplary embodiment, the notification protocol includes any form of data communication that is transmitted from a device to the user's device or vice versa. In one exemplary embodiment, the notification from a device to an Internet cloud based server(s), such as, for example, an email server, text message server, a data monitoring server, or any other electronic communication server, or a local area network (LAN) server by way of a networking protocol using TCP/UDP or secure encrypted protocols. In one exemplary embodiment, once the Internet cloud based server or LAN server receives the communication from the device, the Internet cloud based server or LAN server transmits the interpreted communication, with or without further instructions, to the user's device, such as a smart device, be it a smart phone, mobile computer, computer, laptop, or any other computer device. In one exemplary embodiment, the notification protocol is transmitted from a leak alert device. In one exemplary embodiment, the notification protocol is transmitted from a sensor device associated with a leak alert device.

In one exemplary embodiment, action device 100 enables a user to remotely "turn off" the leak. FIG. 1A is an exemplary block diagram that shows an exemplary configuration of an action device 100. In one exemplary embodiment, when a user attempts to remotely shut off a valve from his/her computer, tablet, smartphone, or laptop, a "turn off" command will be sent to the selected action device associated with that particular valve by way of a networking protocol using TCP/UDP or secure encrypted protocols. WiFi module 110 on the action device will receive the command and forward it to microcontroller 120. In one exemplary embodiment, WiFi module 110 and microcontroller 120 may be integrated into a single module. The microcontroller 120 will interpret the command and switch an associated pin 125 "off" by pulling down its voltage from high to low. In another exemplary embodiment, microcontroller 120 will interpret the command and switch an associated pin 125 off by transmitting an electrical signal. This pin 125 is connected to a relay or transistor 130 and switching the pin to "off" state results in switching off the relay or transistor 130. The power to the electromechanically operated valve 140, such as, for example, a solenoid valve, is looped through the relay or transistor and by turning off the relay the power 145 to the valve will be disconnected. In one exemplary embodiment, WiFi module 110, microcontroller 120 and relay 130 are connected and/or powered up to power module 145. Power module 145 is connected to power input 150. In one embodiment, power input 150 is an AC/DC input. The embodiment shown in FIG. 1A is only an exemplary embodiment and the arrangement of the various modules and components may be rearranged in any manner to suit the purposes of the action device 100.

Figure 1B:
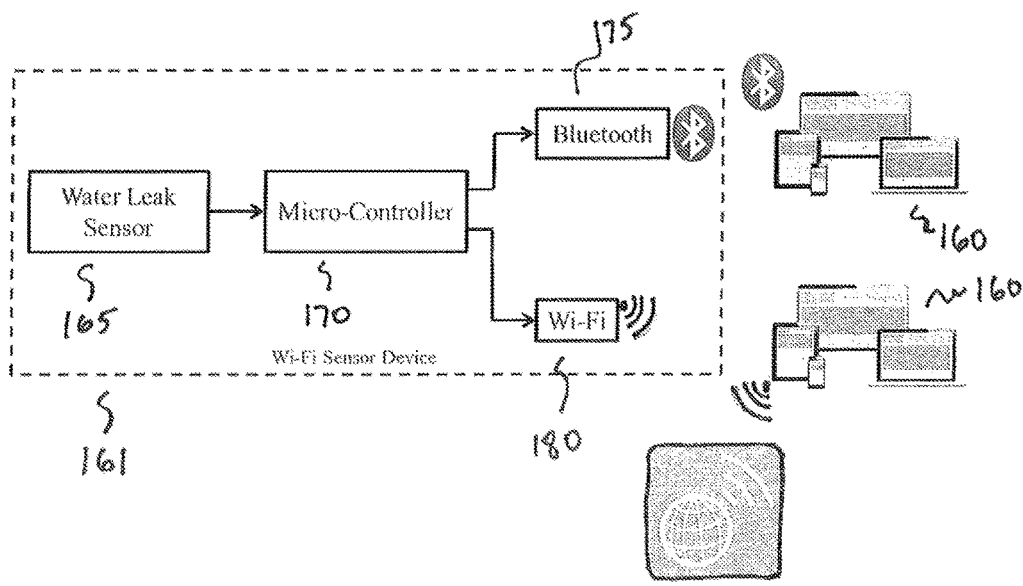
FIG. 1B depicts an exemplary bock diagram of an exemplary embodiment of the present invention.

FIG. 1B illustrates one exemplary embodiment of the preset invention. In one exemplary embodiment of a sensing device 161, the home owner or user may login to the leak detector and alert monitor anytime and review the log file and review the past alerts to check what event at what time happened and take required action, if necessary. The block diagram in FIG. 1B shows exemplary components of aspects of the leak detector and monitor invention and the data flow between the sensing device 161 and the user's computer, tablet, smartphone, or laptop 160. In one exemplary embodiment, the water leak sensor 165 communicates by way of an electrical signal with microcontroller 170. Microcontroller 170 electronically communicates with communication protocols, such as, for example, Bluetooth module 175 or WiFi module 180. In turn, Bluetooth module 175 or WiFi module 180 communicates with the user's computer, tablet, smartphone, or laptop 160, via notification protocols, such as, for example, an internet server, cloud, LAN server or directly through point to point communications.

In one exemplary embodiment essential and optional elements of the leak detector and monitor invention include a water leak sensor, one or more triggers that can generate an indication to the notification protocol unless interrupted by a reset module. In one exemplary embodiment, the trigger(s) is/are also used to disable the notification protocol if desired. Control of the trigger is done either by user input or, optionally, a central monitor and control element through a notification protocol. In one exemplary embodiment, an optional position locator module may report location information with the indication from the water leak sensor to the messaging module.

In one exemplary embodiment, a notification protocol provides information exchange between aspects of the leak detector and monitor invention and the user. It also requests and merges information from the optional position locator module which can be a Global Positioning System (GPS) unit or similar technology. The reset can take input from the user or the system either directly or through the notification protocol.

In one exemplary embodiment, the user interface would typically be implemented as a physical interface not limited to dedicated push buttons, programmable buttons, motion detectors, physiological, and sound detection and generation devices, or display indications.

In one exemplary embodiment, the leak detector and monitor invention may be implemented as a stand-alone portable remote unit with an RF interface or implementation on portable computing platforms such as PDA's or laptop computers, or GPS guidance systems or car help systems (such as General Motors' OnStar.® system) that may be carried/used by at risk individuals. Network based services could also use this technology as where the trigger and reset are provided through the messaging module from the central monitoring and control element.

In one exemplary embodiment, user interface may be via one or more keys on the portable device. Alternative input methods include but are not limited to voice recognition, unit movement (iPhone—e.g. shake, invert, etc.) and touch screens. In one exemplary embodiment, the RF messaging is a cellular system. However, many other RF systems can enable this invention including any combination of satellite, WiFi, WiMax, PMR, Bluetooth and special purpose radio.

Bluetooth and WiFi are the two exemplary and preferable means to connect to both the sensing device and the action device wirelessly. Bluetooth enabled devices such as smartphones can discover and connect to both sensing and action units within the signal range. Custom built applications on the smart device can configure, monitor and send commands to the device(s). In one exemplary embodiment, WiFi is another method to connect the sensor and the action devices. All devices on the same network can detect Wi-Fi leak alert units and take advantage of custom designed applications, which the user can configure, monitor and send commands to the device(s). Moreover, WiFi enabled leak alerts can be accessed remotely from the Internet, providing many advantages to the user, For example, the user can shut off the leaking pipe remotely (e.g. from work or even when away on a trip).

Figure 2:
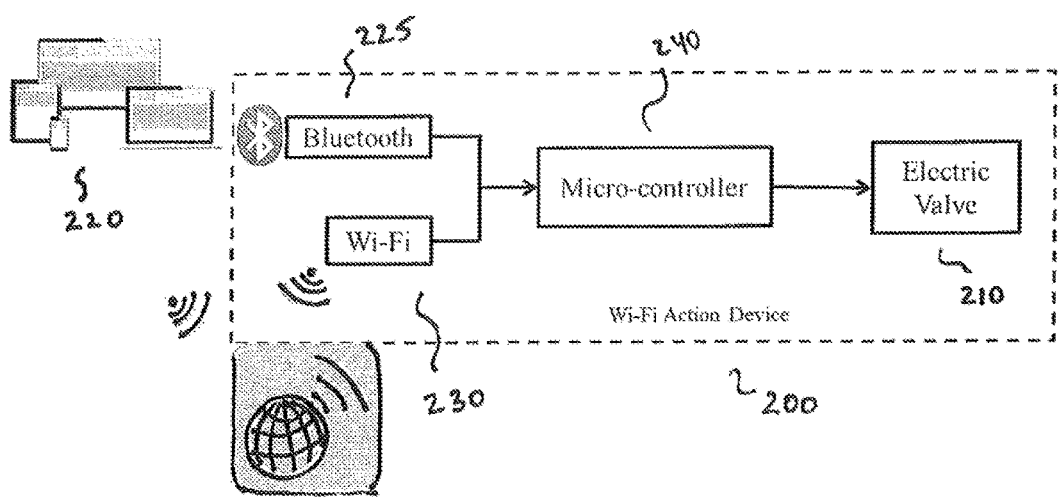
FIG. 2 depicts an exemplary block diagram of an exemplary embodiment of the present invention.

FIG. 2 illustrates a block diagram of one exemplary embodiment of an action device or action unit (used interchangeably herein) 200 of the present invention. In one exemplary embodiment, when an action device 200 is placed in the water supply system, an electronic valve 210 such as a solenoid valve can be placed in the pipeline. This valve can be controlled remotely through smart applications, phone calls, text message or webpage by accessing an integrated webserver on the device. The block diagram in FIG. 2 illustrates exemplary components of a water leak sensor device and data flow between aspects of the leak detector and monitor invention and the user's computer, tablet, smartphone, or laptop 220. In one exemplary embodiment, the user's computer, tablet, smartphone or laptop 220 communicates wirelessly, with, for example, Bluetooth 225 or WiFi 230. The user's signal is processed in microcontroller 240, which then communicates with electric valve 210. In this manner, the user is able to wirelessly control the electric valve 120 from, for example, remote location. In another exemplary embodiment, the user is able to wirelessly shut off electric valve 120.

In one exemplary embodiment, once a water leak is detected, an alert will be sent to the user or a list of users describing what pipe (or appliance) and at what time had a leak problem. The user then can send a message back to give a command to the device for instance, to shut off the valve supplying water to the leaking pipe (or appliance). In one exemplary embodiment, once a water leak is detected, an alert will be emailed to the user or a list of users describing what pipe (or appliance) at what location and at what time had the problem. In one exemplary embodiment, when an alert occurs, all smart devices configured and paired with aspects of the leak detector and monitoring invention (whether running the iOS or Android operating system) will receive a push notification pop up on their screens showing the alert. The user than may launch the monitoring/action application to see the event details and take the required action(s). For instance, the user may shut off the corresponding control valve (if available) or call a friend or technician to check the pipe. In one exemplary embodiment, each Wi-Fi water leak detector will have an embedded webserver that monitors the events and logs them. This webserver can be used to configure a device or number of the devices on the network. Moreover, this webserver can control electronic valves if required. In one exemplary embodiment, whether using a text message, phone call, smart device app or embedded webserver, there is always a two-way communication between the end user and the Wi-Fi sensor or action unit. The block diagram in FIG. 3 illustrates an exemplary data flow from aspects of the leak detector and monitor invention to the user's device and from the user's device to the action device.

Figure 3:
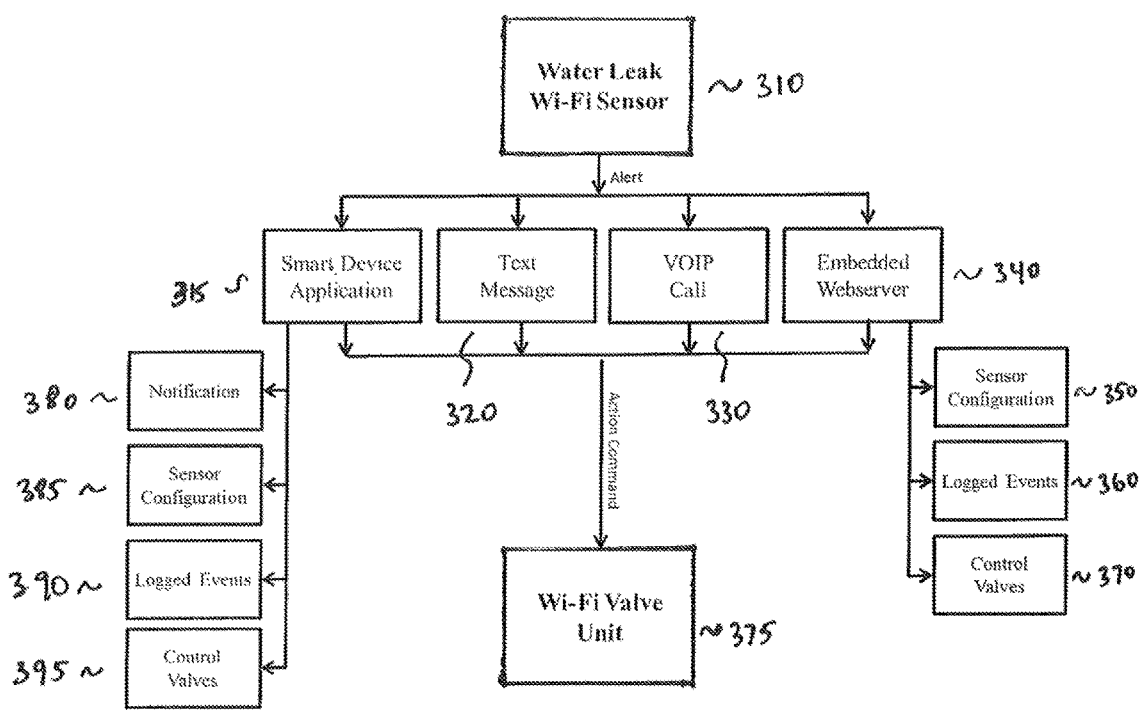
FIG. 3 depicts an exemplary block diagram of an exemplary embodiment of the present invention.

FIG. 3 illustrates an exemplary embodiment, where the water leak sensor, microcontroller, and Wi-Fi module can be integrated into one module, such as, for example, the WiFi Leak Sensor 310. In one exemplary embodiment, the user can communicate with the WiFi Leak Sensor 310. Once activated, WiFi Leak Sensor 310 communicates, for example, and alert message, to the user's smart device application 315. Smart device application 315, includes, for example sensor configurations 385 that include networking configurations that enable the smart device application 315 to connect to a network hub, such as an access point or router, that enables wireless communication. Sensor configurations 385 may also include date setting, unique identifications, user information, etc., so that smart device application 315 can communicate with one or more users. Smart device application 315 may also include alert notifications 380 to signal the user that the leak sensor 310 has detected leakage. In another embodiment, smart device application 315, includes, a logged events feature 390 which records past events, such as leak detection, power status, etc. In one exemplary embodiment, smart device application 315 includes control valve instructions 395 that enable the user(s) to remotely communicate with WiFi Valve Unit 375. In one exemplary embodiment, an electronic valve, microcontroller, and a WiFi module are integrated into a single module, such as a WiFi Valve Unit 375.

In one exemplary embodiment, Wi-Fi Leak Sensor 310 also includes the ability to communicate with the user(s) via any form of notification protocols, such as, for example, text 320. In one exemplary embodiment, Wi-Fi Leak Sensor 310 includes the feature of sending VOIP phone message when WiFi Leak Sensor 310 detects leakage. In this exemplary embodiment, the user(s) may respond via VOIP and instruct the action device 375 to shut down. In one exemplary embodiment, a Wi-Fi Leak Sensor 310, includes an am embedded webserver 340 that monitors the events and logs events 350, configures a device or number of the devices on the network 360, and/or controls valves 370. In one exemplary embodiment, the user can communicate with the action unit 375. Once the user receives one or more notifications, such as, for example, notifications 320 and/or 330, the user can use embedded server 340 so that the valves may be controlled and/or shut on or off remotely.

Figure 4:
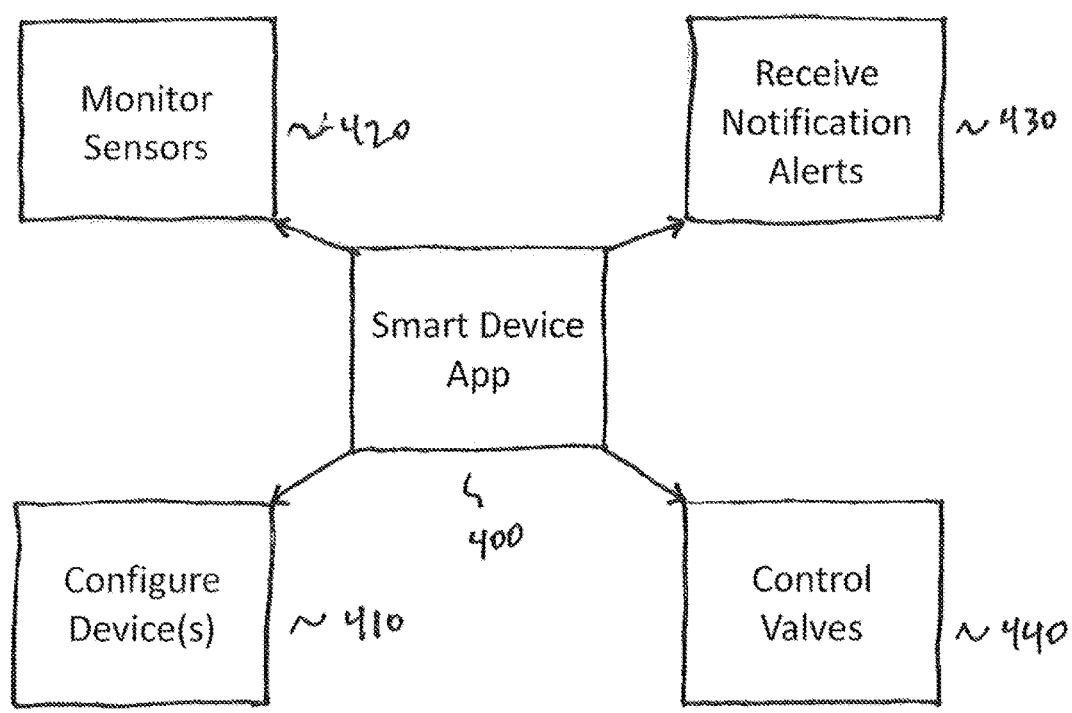
FIG. 4 depicts an exemplary block diagram of an exemplary embodiment of the present invention.

The exemplary block diagram in FIG. 4 illustrates the use of smart device applications. In one exemplary embodiment, applications will be available for Android, iOS or windows mobile devices. These applications are responsible for delivering water leak alerts to a user. Additionally, these applications enable a user to configure, monitor and/or control action devices remotely. In one exemplary embodiment, smart device application 400, includes enhanced user interaction features such as, for example, device configuration features 410, monitor sensors 420, notifications 430, and control over valves 440. These exemplary enhancements enable the user to remotely be informed of the status of the leak alert sensors and interact with the remote electric valve.

Figure 5:
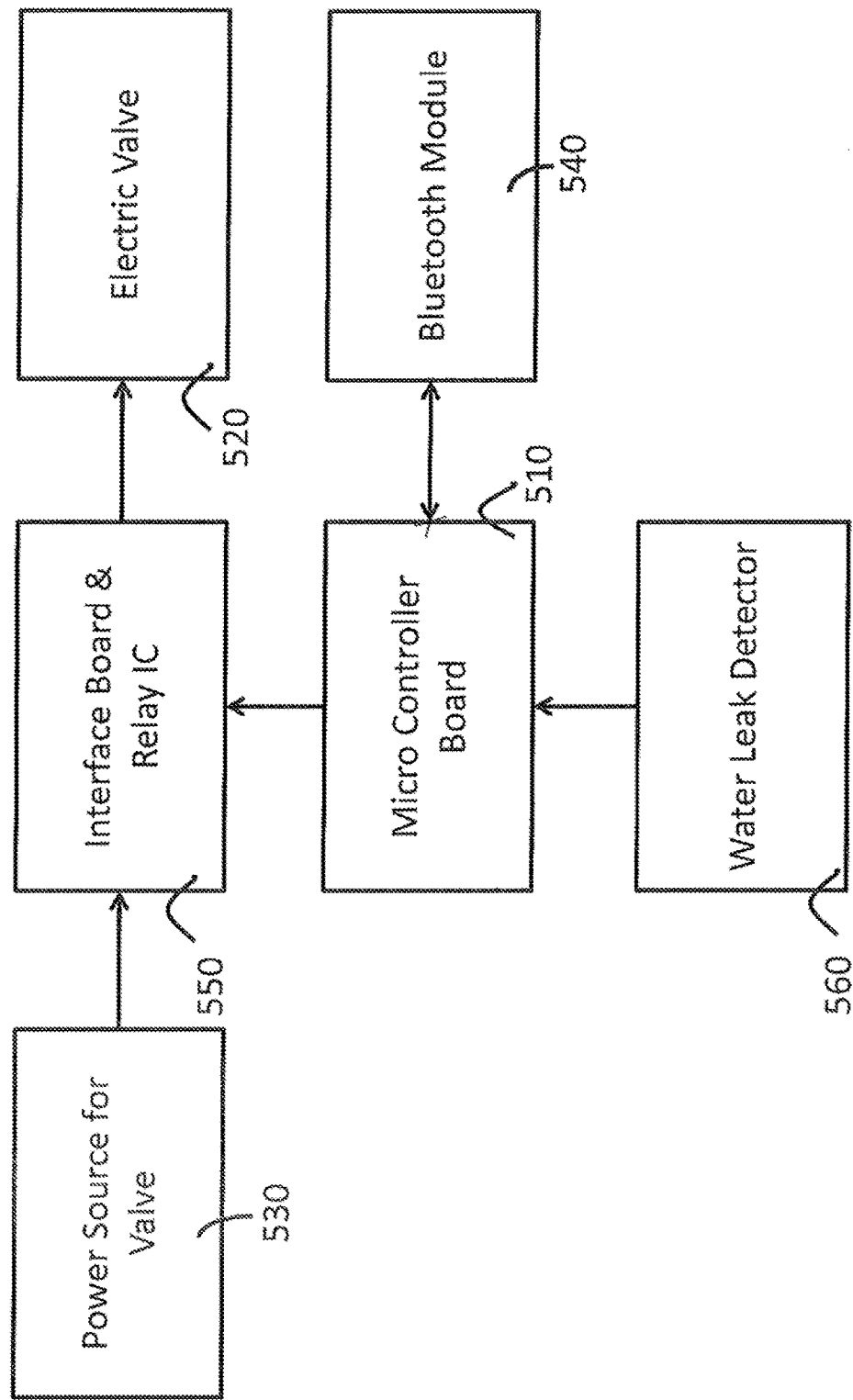
FIG. 5 depicts an exemplary embodiment of the present invention.

FIG. 5 depicts an exemplary embodiment of the present invention. In the exemplary embodiment, the following optional components are shown, a microcontroller 510, an electric valve 520, a power source for the valve 530, a Bluetooth module 540, an interface board/relay IC 550, and a leak detector 560. In one exemplary embodiment, microcontroller 510, Bluetooth module 540, interface board/relay IC 550 are all housed with leak detector 560. In one exemplary embodiment, once leak detector 560 detects a leak, it communicates to a smart device (not shown). The user can then respond and provide necessary instructions from his smart device to the microcontroller 510 which then instructs electric valve 520 to shut on or off.

In one exemplary embodiment, the leak alert and monitor system includes at least one leak alert sensor, at least one microcontroller, and a WiFi module and/or Bluetooth or any other form of wireless communication module housed in single casing to form, for example, a WiFi Sensor Device or Sensor Device. In one exemplary embodiment, an electronic valve, a microcontroller and WiFi and/or Bluetooth or any other form of wireless communication module is housed in a WiFi Action Device or Action Device. In one exemplary embodiment, the Sensor Device and the Action Device are either wirelessly or physically connected to transmit and receive electronic signals to exercise control over at least one electronic valve. In one exemplary embodiment, an electronic valve is physically connected to the microcontroller housed within the Sensor Device to receive and transmit electronic signals.

Figure 6:
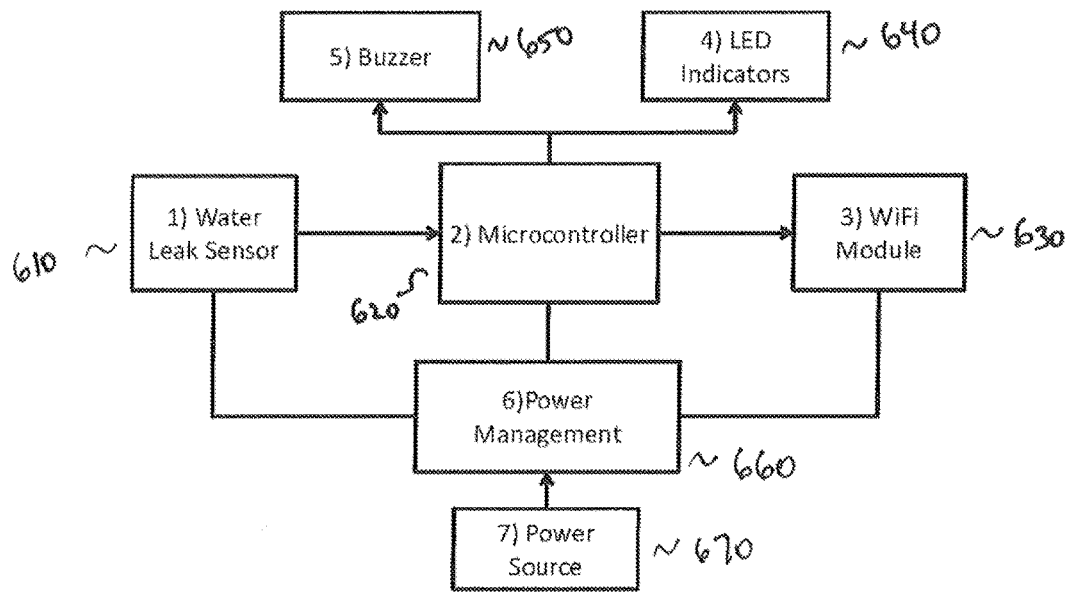
FIG. 6 depicts an exemplary block diagram of an exemplary embodiment of the present invention.

FIG. 6 depicts an exemplary block diagram of an exemplary embodiment of the present invention. In one exemplary embodiment, aspects of the present invention include the following exemplary components: a leak sensing unit 610, a microcontroller 620, a WiFi module or Bluetooth 630, a notification protocol that includes, for example, an LED indicator 640 or other notifying element such as, for example, a buzzer 650, speaker, or other similar device, a power management system (PMS) 660, and a power source 670. In one exemplary embodiment, the purpose of the PMS is to provide and maintain required power input for each component feature.

In one exemplary embodiment, a leak sensing unit is capable of detecting a leak or a predetermined amount of liquid, such as for example, a flood by measuring the electrical conductivity (or impedance) at two ends of its metal probe. Once the conductivity of a liquid such as water between metal probes reaches to a defined point, an internal flag turns on and an alert signal is sent to the microcontroller.

In one exemplary embodiment, a microcontroller is responsible to initialize other components of the board such as speakers (or buzzer), WiFi module, Bluetooth module, LEDs and etc. In one exemplary embodiment, the microcontroller monitors the battery level and updates the battery indicator on user's remote device. In one exemplary embodiment, the microcontroller is also responsible for providing requested data to a connected remote device.

In one exemplary embodiment, the WiFi module is a WiFi IEEE 802.11 (a/b/g/n/d/e/i/k/r/ac/ad) standard module that is a wireless transceiver which transmits and receives data between microcontroller and user's smart device. In one exemplary embodiment, the WiFi IEEE 802.11 (ah/aj/ax/ay) standard module that is a wireless transceiver which transmits and receives data between microcontroller and the user's smart device or netport axis point. In one exemplary embodiment, the WiFi module establishes the connection in two ways, such as, for example, acting as an Access Point (AP), the WiFi module can be initialized by the microcontroller to be a host to WiFi devices such that all the nearby devices can discover and conned to the Wi-Fi leak alert monitoring system. In one exemplary embodiment, the WiFi module acts as a network client where the WiFi module can be initialized by a microcontroller to act as a client to connect to an existing Wi-Fi network and connect to the internet using an existing wireless hub or router. The network configuration is done by using a custom designed application on a smart device. In one exemplary embodiment, the WiFi module is programed through SDIO, UART or I2C interfaces. In one exemplary embodiment, the transmission antenna can be integrated on the module or connected externally.

in one exemplary embodiment, the LED Indicator includes at least one LED that flashes when a leak is detected, or the battery is low.

In one exemplary embodiment, a notifying element, such as, for example, a buzzer, generates alert sound when a leak is detected, notifying the home owner, property manager, etc.; also the buzzer sends a buzz when the battery is low.

In one exemplary embodiment, the PMS is responsible for providing power to each component on the system. The PMS includes regulator ICs, voltage converters, voltage monitoring IC and surge protection circuitry.

In one exemplary embodiment, the power source is supplied by replaceable or rechargeable batteries. In one exemplary embodiment, power is supplied by an internal battery where the battery is charged wirelessly using inductive charging method. In one exemplary embodiment, the inductive battery charger can be used to indicate a power outage in the host building.

Applications of the present invention may be configured in numerous exemplary methodologies. In one example, a configuration is as follows:
Device name
Date and time
Network configuration
Phone number(s) to send text or call
Email address(es) to send email
Reset/clear log
Valve(s) action configuration
Linking sensors and valves
External device drivers In one exemplary embodiment, electronic valves may be configured in several ways. In one example, the electronic valve may be configured manually when the user needs to connect to the electronic valve remotely and turn the valve on or off. In another example, the electronic valve may be configured automatically where the valve would turn off automatically once a leak alert is detected. Later the user can reset the valve to "on" once the leak area is inspected. Yet in another example, the electronic valve may be configured with a timer functionality whereby the electronic valve will be shut off automatically after a given amount of time once an alert is detected. This will give the user enough time to investigate the cause of the alert, but if the user is busy or out of reach, the valve would default to "off" for security and safety purposes.

Figure 7:
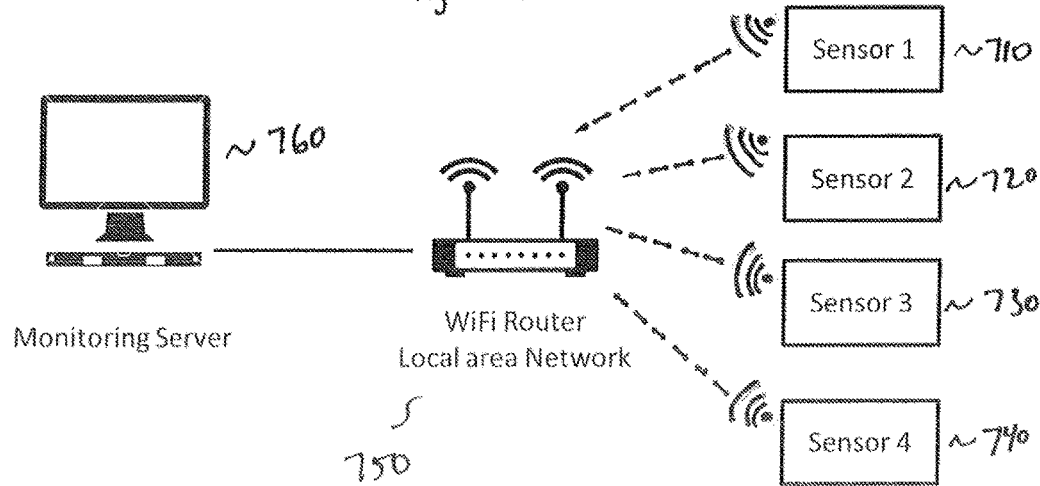
FIG. 7 depicts an exemplary diagram of an exemplary embodiment of the present invention.

Another exemplary embodiment to setup the Wi-Fi leak monitoring system is by installing a monitoring server connected to the same network as sensors are connected to monitor all the Wi-Fi leak alert sensors activities at the same time from one universal server. This method of monitoring is beneficial to residential complexes, hospitals, educational academies or any other large facilities which requires more than one Wi-Fi sensor to be installed. In this exemplary configuration all the WiFi sensor devices will be programmed to report to the main server and an administrator or operator can review and monitor events and take a required action when an alert received from a sensor. Moreover, the software on the monitoring server will be able to control a variety of devices such as electrical switches, valves and equipment on the same network and different locations remotely through Wi-Fi network. For example, an administrator in a hospital may shut down a malfunctioning washer-dryer remotely by using the monitoring software when a washer dryer is leaking water on the floor. FIG. 7 shows how the sensors are connected to the network in this configuration. There could be more than one WiFi router or access point on this configuration. In one exemplary embodiment, sensors 710, 720, 730, and 740 are wirelessly connected to WiFi Router LAN 750. In this example, only four (4) sensors are shown, however, there can be any number of sensors. WiFi Router LAN 750 is connected to monitoring server 760 which enables the user to organize, monitor, and configure any number of sensors from a minimal number of user interfaces.

Figure 8:
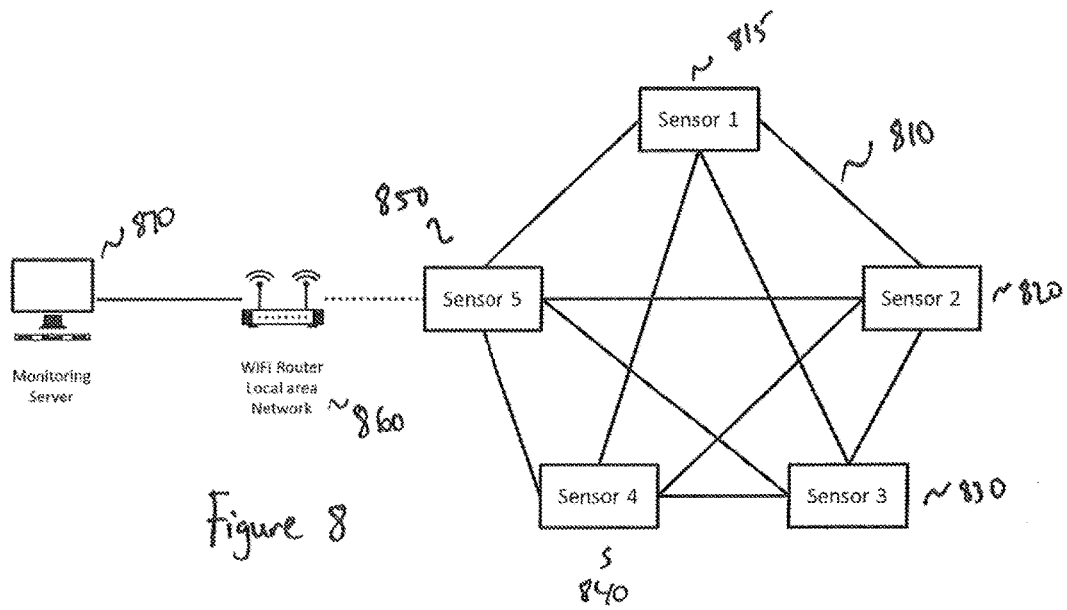
FIG. 8 depicts an exemplary diagram of an exemplary embodiment of the present invention.

In another exemplary embodiment, all the WiFi sensors on the same network can be setup as a mesh network 810 to improve the WiFi signal strength and cover possible dead spots on a building. Just like local area network configuration explain previously, sensors 815, 820, 830, 840, and 850 on a mesh network are connected to a wireless access point hub or router 860 to communicate with the monitoring server 870. FIG. 8 illustrates an exemplary mesh network configuration. In this example, only five (5) sensors are shown, however, there can be any number of sensors. Wireless access point hub 860 is connected to monitoring server 870 which enables the user to organize, monitor, and configure any number of sensors from a minimal number of user interfaces.

Figure 9:
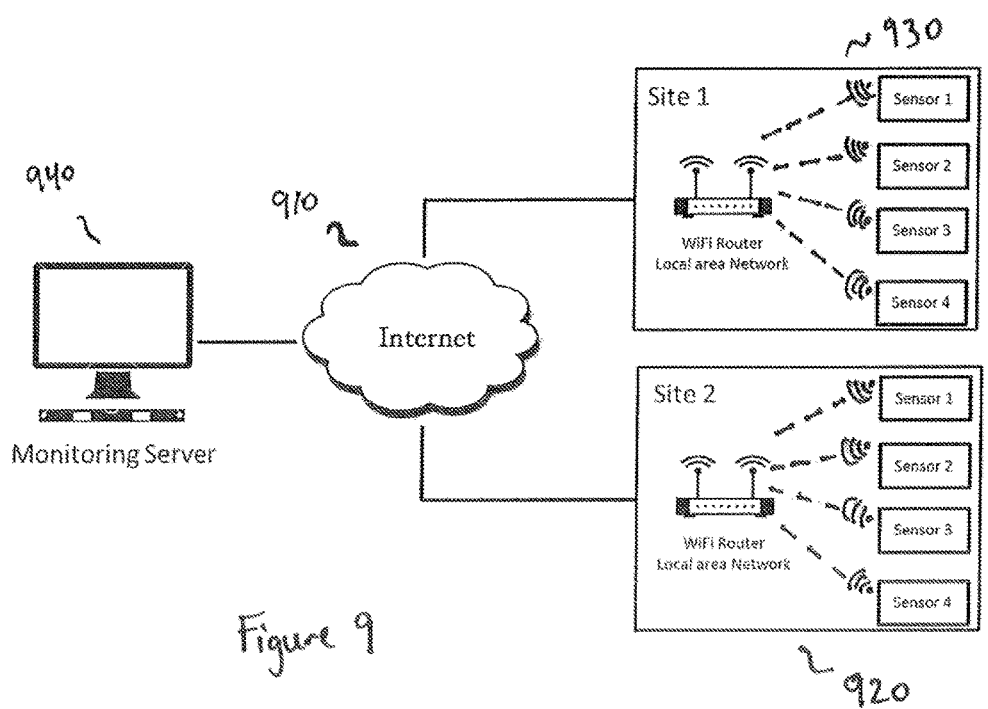
FIG. 9 depicts an exemplary diagram of an exemplary embodiment of the present invention.

In another exemplary way to monitor WiFi water leak sensors installed in large facilities remotely is through internet connection or cloud services 910. In this method multiple locations 920 and 930 can be added to one central system and an administrator will be able to monitor all sites at the same time. In this configuration the monitoring software can be installed on a remote site computer (i.e. a monitoring center) 940, to monitor multiple locations and facilities at the same time with a unified system. For example, an organization may manage more than one hospital, thus the monitoring server 940 can be located somewhere else other than the hospitals' locations (i.e. in organization's headquarter). FIG. 9 shows an exemplary remote site(s) monitoring using the Internet or could connection. In this example, only two (2) sites are shown, however, there can be any number of sites. The monitoring server 940 is connected to internet or cloud services which enables the user to organize, monitor, and configure any number of sites from a minimal number user interfaces.

The instructions may be loaded into the memory of the server or client computers from a storage device or from one or more other computer systems over a network connection. For example, a client computer may transmit a sequence of instructions to the server computer in response to a message transmitted to the client over a network by the server. In one exemplary embodiment, as the server receives the instructions over the network connection, it stores the instructions in memory. The server may store the instructions for later execution, or it may execute the instructions as they arrive over the network connection. In some cases, the CPU may directly support the downloaded instructions. In other cases, the instructions may not be directly executable by the CPU, and may instead be executed by an interpreter that interprets the instructions. In other embodiments, hardwired circuitry may be used in place of, or in combination with, software instructions to implement the present invention. Thus tools used in the present invention are not limited to any specific combination of hardware circuitry and software, nor to any particular source for the instructions executed by the server or client computers. In some instances, the client and server functionality may be implemented on a single computer platform.

Thus, the present invention is not limited to the embodiments described herein and the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein. Rather, the disclosed embodiments are provided so that this disclosure will be thorough and complete, and will fully convey the scope of the invention to those skilled in the art.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

Still further, while certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A leak detector and monitor comprising:
a sensing device, said sensing device comprising at least one first microcontroller, at least one first wireless communication module, and at least one leak sensor adapted to detect a leak of a substance;
said at least one first microcontroller adapted to receive a signal from the at least one leak sensor; and
said at least one first wireless communication module adapted to receive the signal from the at least one first microcontroller, whereby the at least one first wireless communication module transmits an electronic message to at least one user via at least one first wireless communication network, whereby the user wirelessly communicates user's instructions to exercise control over an action device using at least one second wireless communication network, wherein said action device comprises a power module, a second wireless communication module, a second microcontroller, a relay, and at least one electrical valve, and wherein said relay transmits at least one electrical signal to the electrical valve upon receipt of instructions from said at least one user, and upon completing said at least one user's instructions said second wireless communication module sends an acknowledgement of completion of said at least one user's instructions to said at least one user using said at least one second wireless communication network.

2. The leak detector and monitor of claim 1, wherein the at least one first wireless communication module transmits notifications to the at least one user via said at least one first wireless communication network.

3. The leak detector of claim 1, wherein the leak sensor, said at least one first microcontroller and said at least one first wireless communication module are housed as a sensor device.

4. The leak detector of claim 3, wherein said electrical valve is physically connected to one of said first or second microcontroller and housed together in the sensor device.

5. The leak detector of claim 1, wherein said action device and said sensing device are housed together.

6. The leak detector of claim 1, wherein at least one leak sensor is set up as a mesh network, whereby multiple sensors are connected to a wireless access point hub to communicate with a monitoring server.

7. A leak detector and monitor comprising:
a sensing device, said sensing device comprising at least one lust microcontroller, at least one first wireless communication module, and at least one leak sensor adapted to detect a leak of a substance;
said at least one first microcontroller adapted to receive a signal from the at least one leak sensor; and
said at least one first wireless communication module adapted to receive the signal from the at least one first microcontroller, whereby the at least one first wireless communication module transmits an electronic message to an Internet cloud based server and the Internet cloud based server transmits the electronic, message to a user's device via at least one first wireless communication network, whereby the user wirelessly communicates user's instructions using at least one second wireless communication network to the Internet cloud based server and the Internet cloud based server transmits the user's instructions to exercise control over an action device, wherein said action device comprises a power module, a second wireless communication module, a second microcontroller, a relay, and at least one electrical valve, and wherein said relay transmits at least one electrical signal to the electrical valve upon receipt of instructions from said at least one user, and upon completing said at least one user's instructions said second wireless communication module sends an acknowledgement of completion of said at least one user's instructions to said at least one user using said at least one second wireless communication network.

8. The leak detector and monitor of claim 7, Wherein the at least one first wireless communication module transmits notifications to the at least one user via said at least one first wireless communication network.

9. The leak detector of claim 7, wherein the leak sensor, said at least one first microcontroller and said at least one first wireless communication module are housed as a sensor device.

10. The leak detector of claim 9, wherein said electrical valve is physically connected to one of said first or second microcontroller and housed in the sensor device.

11. The leak detector of claim 7, wherein said action device and said sensing device are housed together.

12. A method of remotely exercising control over an electrical valve comprising the steps of;
   positioning at least one leak detector having a first microcontroller and a first wireless communication module in a location amenable to detecting leaks;
   receiving a notification of a leak from one of said at least one leak detector via, said first wireless communication module via at least one first wireless communication network; and
   communicating instructions from at least one user using at least one second wireless communication network to a second microcontroller via a second wireless communication module to exercise control over an electrical valve, whereby causing the electrical valve to be shut off to stop said leak, and upon completing said at least one user's instructions said second wireless communication module sends an acknowledgement of completion of said at least one user's instructions to said at least one user using said at least one second wireless communication network.

13. The method of claim 12, further comprising the step of receiving a notification of a leak from an Internet cloud based server.

14. The method of claim 12, further comprising the step of wirelessly communicating instructions to an Internet cloud based server, whereby the Internet cloud based server transmits the instructions to said second microcontroller.

15. The leak detector of, claim 1, wherein said action device and said sensing device are housed together as an integrated unit.

16. The leak detector of claim 1, wherein said action device and said sensing device are housed together as an integrated unit, and wherein said at least one first wireless communication module is different than said second wireless communication module.

17. The leak detector of claim 1, wherein said at least one first wireless communication module is selected from a group consisting of a Bluetooth module, a WiFi module, and a WiFi IEEE 802.11 (a/b/g/n/d/e/i/k/r/ac/ad) module.

18. The leak detector of, claim 7, wherein said action device and said sensing device are housed together as an integrated unit.

19. The leak detector of claim 7, wherein said action device and said sensing device are housed together as an integrated unit, and wherein said at least one first wireless communication module is different than said second wireless communication module.

20. The leak detector of claim 7, wherein said at least one first wireless communication module is selected from a group consisting of a Bluetooth module, a WiFi module, and a WiFi IEEE 802.11 (a/b/g/n/d/e/i/k/r/ac/ad) module.

\* \* \* \* \*